United States Patent
Renz et al.

(10) Patent No.: US 9,754,273 B2
(45) Date of Patent: Sep. 5, 2017

(54) ENTERPRISE RESOURCE TRACKING OF KNOWLEDGE

(75) Inventors: Alex Renz, Copenhagen (DK); Kristian Tørning, Copenhagen (DK); Bjarne Schøn, Nærun (DK)

(73) Assignee: Microsoft Technology Licensing, LLC, Redmond, WA (US)

( * ) Notice: Subject to any disclaimer, the term of this patent is extended or adjusted under 35 U.S.C. 154(b) by 2179 days.

(21) Appl. No.: 11/612,499

(22) Filed: Dec. 19, 2006

(65) Prior Publication Data
US 2008/0147452 A1    Jun. 19, 2008

(51) Int. Cl.
| | |
|---|---|
| G06Q 30/00 | (2012.01) |
| G06Q 30/02 | (2012.01) |
| H04L 29/06 | (2006.01) |
| G06Q 10/06 | (2012.01) |
| G06Q 10/10 | (2012.01) |
| H04L 12/911 | (2013.01) |

(52) U.S. Cl.
CPC ....... *G06Q 30/0202* (2013.01); *G06Q 10/063* (2013.01); *G06Q 10/10* (2013.01); *H04L 29/06027* (2013.01); *H04L 47/70* (2013.01)

(58) Field of Classification Search
None
See application file for complete search history.

(56) References Cited

U.S. PATENT DOCUMENTS

| | | | |
|---|---|---|---|
| 6,092,098 A | 7/2000 | Araki et al. | |
| 6,094,431 A * | 7/2000 | Yamato et al. | 370/395.21 |
| 6,192,338 B1 | 2/2001 | Haszto et al. | |
| 6,453,349 B1 * | 9/2002 | Kano et al. | 709/226 |
| 6,515,211 B2 * | 2/2003 | Umezawa et al. | 84/477 R |
| 6,529,499 B1 * | 3/2003 | Doshi et al. | 370/352 |
| 6,615,186 B1 * | 9/2003 | Kolls | 705/14.51 |
| 6,795,431 B2 * | 9/2004 | Endo | 370/352 |
| 6,839,682 B1 * | 1/2005 | Blume et al. | 705/10 |
| 6,883,000 B1 * | 4/2005 | Gropper | |
| 7,054,938 B2 * | 5/2006 | Sundqvist et al. | 709/227 |
| 7,076,529 B2 | 7/2006 | Koch et al. | |
| 7,126,963 B2 * | 10/2006 | Peyravian et al. | 370/443 |
| 7,505,471 B2 * | 3/2009 | Furukawa et al. | 370/400 |
| 7,506,011 B2 * | 3/2009 | Liu et al. | |
| 7,633,949 B2 * | 12/2009 | Zadikian et al. | 370/396 |
| 7,810,114 B2 * | 10/2010 | Flickinger et al. | 725/32 |
| 2002/0026638 A1 * | 2/2002 | Eldering et al. | 725/42 |
| 2002/0055975 A1 * | 5/2002 | Petrovykh | 709/205 |

(Continued)

OTHER PUBLICATIONS

International Search Report dated Jan. 22, 2008 for PCT/US2007/079637, 10 pages.

(Continued)

*Primary Examiner* — Gurkanwaljit Singh
(74) *Attorney, Agent, or Firm* — Perkins Coie LLP

(57) ABSTRACT

The claimed subject matter provides a system and/or a method that facilitates utilizing data within a network including numerous data communications. An interface that can receive data associated with a data communication within a network. An enterprise resource track (ERT) component that can generate context associated with the data communication and at least one resource to enable a second data communication to be efficiently directed to the at least one resource based on the generated context.

20 Claims, 12 Drawing Sheets

(56) References Cited

U.S. PATENT DOCUMENTS

| | | | |
|---|---|---|---|
| 2002/0083178 A1* | 6/2002 | Brothers | 709/226 |
| 2002/0091875 A1* | 7/2002 | Fujiwara et al. | 709/330 |
| 2002/0134224 A1* | 9/2002 | Umezawa et al. | 89/1.1 |
| 2003/0130976 A1 | 7/2003 | Au | |
| 2004/0054690 A1 | 3/2004 | Hillerbrand et al. | |
| 2004/0098274 A1* | 5/2004 | Dezonno et al. | 705/1 |
| 2004/0204973 A1* | 10/2004 | Witting et al. | 705/7 |
| 2004/0204975 A1* | 10/2004 | Witting | 705/7 |
| 2004/0204982 A1* | 10/2004 | Witting | 705/10 |
| 2004/0230572 A1 | 11/2004 | Omoigui et al. | |
| 2004/0260749 A1 | 12/2004 | Trossen et al. | |
| 2005/0010428 A1 | 1/2005 | Bergeron et al. | |
| 2005/0021532 A1 | 1/2005 | Ghandour | |
| 2005/0091192 A1 | 4/2005 | Probert | |
| 2005/0114207 A1* | 5/2005 | Jania | 705/14 |
| 2005/0132060 A1* | 6/2005 | Mo et al. | 709/227 |
| 2005/0159996 A1* | 7/2005 | Lazarus et al. | 705/10 |
| 2006/0031107 A1* | 2/2006 | Aihara et al. | 705/7 |
| 2006/0052095 A1* | 3/2006 | Vazvan | 455/420 |
| 2006/0074980 A1 | 4/2006 | Sarkar et al. | |
| 2006/0173957 A1 | 8/2006 | Robinson et al. | |
| 2006/0184511 A1 | 8/2006 | Koo et al. | |
| 2007/0288298 A1* | 12/2007 | Gutierrez et al. | 705/10 |
| 2007/0288304 A1* | 12/2007 | Gutierrez et al. | 705/10 |
| 2007/0299804 A1* | 12/2007 | Liu et al. | 707/1 |
| 2008/0028006 A1* | 1/2008 | Liu et al. | 707/204 |

OTHER PUBLICATIONS

Hoser, et al. "Semantic Network Analysis of Ontologies" (2006) Workshop on Ontologies in Peer-to-Peer Communities at ESWC, 15 pages.

Golbeck, et al. (2004) "Inferring Reputation on the Sematic Web" ACM, 8 pages.

Girardi, et al. "An Ontology-Based Techniques for the Specification of Domain and User Models in Mulit-Agent Domain Engineering" (2004) CLEI Election J.7(1), 11 pages.

* cited by examiner

ENTERPRISE RESOURCE TRACKING OF KNOWLEDGE

BACKGROUND

Technological advances in computer hardware, software and networking have lead to increased demand for electronic information exchange rather than through conventional techniques such as paper and telephone correspondence, for example. Such electronic communication can provide split-second, reliable data transfer between essentially any two locations throughout the world. Many industries and consumers are leveraging such technology to improve efficiency and decrease cost through web-based (e.g., on-line) services. For example, consumers can purchase goods, review bank statements, research products and companies, obtain real-time stock quotes, download brochures, etc. with the click of a mouse and at the convenience of home.

As the amount of available electronic data grows, it becomes more important to store and/or utilize such data in a manageable manner that facilitates user-friendly and quick data searches and retrieval. Generally, various companies, enterprises, business, and the like include a tremendous amount of data, metadata, etc. For example, office productivity tools (e.g. word processing, spread sheets, presentation software, mail applications, contact applications) can include a shear wealth of information about the user itself as well as a user's contact lists and/or interaction with contacts.

In general, enterprises can employ a vast number of internal and/or external communications and information transfer. For example, internal and/or external communications and information transfer can include, but are not limited to electronic mail (email), Internet Protocol (IP) telephony, web mail, web-browsing, text messaging over a network of two or more computers (or network connectable, processor-based devices). Conventional systems and/or techniques fail to leverage these massive amounts of information associated with business, enterprises, entities, networks, and the like in order to enhance productivity, efficiency, and lower costs.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate gathering data related to a network communication to generate context. An enterprise resource track (ERT) component can receive data via an interface, wherein the data can be related to a network and such data can be evaluated to generate a context and/or relevance therewith. The ERT component can ascertain a deeper understanding of the examined data related to the network in order to provide enhanced productivity and/or efficiency throughout. For instance, the ERT component can monitor data communications within the network corresponding to at least one resource, wherein based on such monitoring a data context can be generated to allow data and/or data communications to be directed, channeled and/or pipelined to the appropriate resource. For example, the ERT component can evaluate email communications within the network in order to ascertain that a particular resource has a vast knowledge related to orientation materials. Thus, communications inquiring and/or related to orientation materials can be directed to that particular resource.

The ERT component can examine any suitable number of networks, wherein the networks can employ various data communications with specific data formats. The data communications can be, for instance, email, instant messaging, web-browsing, web-mail, Internet protocol (IP) telephony, audio communications, video communications, voice mail, video mail, facsimile, metadata associated with a data communication, a software application associated and/or utilized by the resource, and/or any other suitable data that can be evaluated to provide a context thereof. Moreover, there can be any suitable number of ERT components that can extrapolate data context based on evaluating data within the network.

Furthermore, the ERT component can leverage the data context generated based on data communications in order to assist with inquiries and/or requests within the network. For example, the ERT component can employ a context-based ontology which can be utilized to assist with the following situations and/or examples within a network: finding the appropriate person, finding the appropriate question to ask, ensuring ongoing information is up-to-date, auto-generating distribution lists, auto-generating mail recipients, auto-generating pre-meeting content, auto-generating organizational chart reporting structure, auto-generating virtual organizational chart, providing top down information dissemination and bottom up control, etc. In other aspects of the claimed subject matter, methods are provided that facilitates gleaning data from a plurality of networks for efficient utilizing of data communications and respective content.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
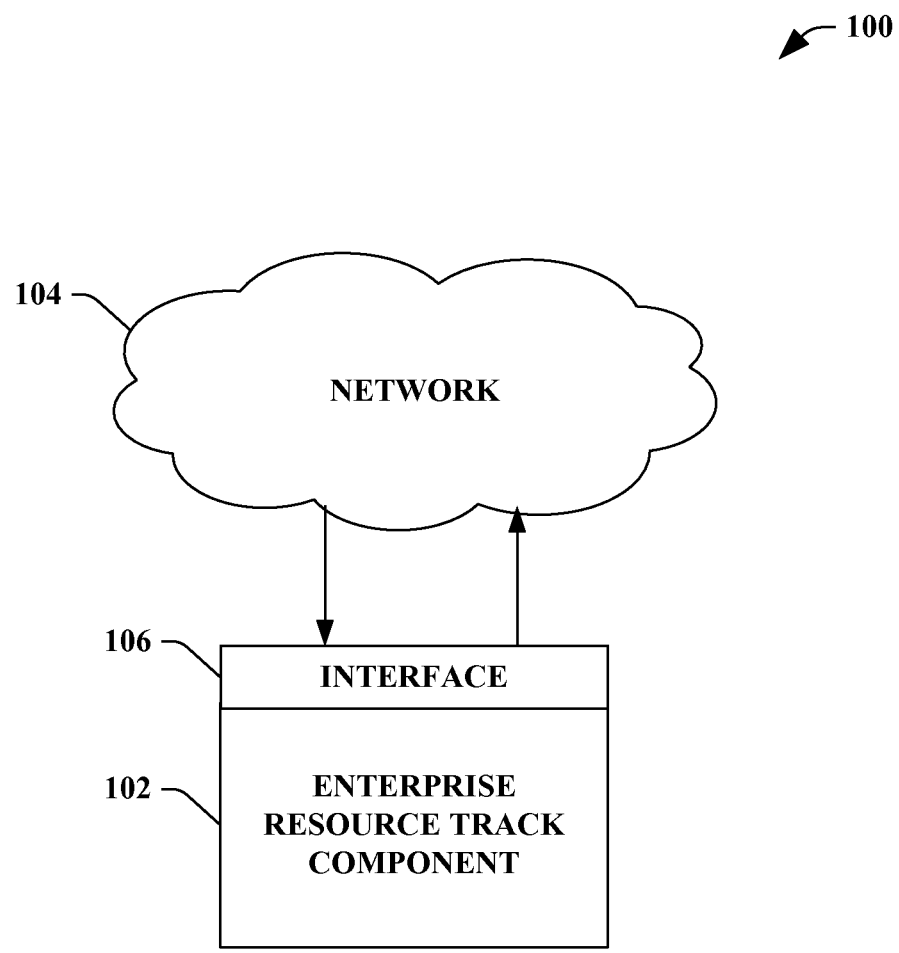
FIG. 1 illustrates a block diagram of an exemplary system that facilitates gathering data related to a network communication to generate context.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "interface," "network," "locator," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates gathering data related to a network communication to generate context. The system 100 can include an enterprise resource track (ERT) component 102 that can receive data (e.g. data related to a communication session, data related to a data communication, etc.) via an interface component 106 (e.g., discussed in more detail below), wherein the ERT component 102 can formulate a context associated with at least one resource within a network 104 based at least in part upon the received data. In other words, the ERT component 102 can glean information associated with various data communications within the network 104 in order to allow the system 100 to be aware of data content and/or provide data relevance. With such data relevance and/or awareness based on the collection and/or analysis of gleaned data, the ERT component 102 can efficiently direct data communications to particular resources such that the resources have knowledge of topics within the directed data communications.

It is to be appreciated that the resource can be a user, a person, an employee, a machine, a computer, a laptop, a server, a network, a department, a handheld, an email address, an email alias, an Internet protocol (IP) address, a website, a database, a contractor, a company, and/or any other suitable entity that can data can be directed and/or communicated to for response. Furthermore, the ERT component 102 can evaluate and/or monitor any suitable data related to a data communication such as, but not limited to, email, instant messaging, web-browsing, web-mail, Internet protocol (IP) telephony, audio communications, video communications, voice mail, video mail, facsimile, metadata associated with a data communication, a software application associated and/or utilized by the resource, and/or any other suitable data that can be evaluated to provide a context thereof.

For example, the ERT component 102 can continuously glean email communications (e.g., any suitable data communication) associated with the network 104 in order to provide data context and/or relevancy. Thus, email communication between various users and/or machines can be evaluated in order to formulate an understanding on which particular resources correspond to specific topics and/or contexts ascertained. In other words, if a first user continuously answers marketing questions received by various entities within a company, the ERT component 102 can evaluate such data communications and direct data inquiries associated with marketing to such user through any suitable data communication.

For example, the ERT component 102 can evaluate productivity tools (e.g., word processing, spread sheets, presentation software, mail applications, contact applications, etc.), wherein such productivity tools can contain a shear wealth of information about a resource (e.g. user, machine, department, etc.) itself as well as well as a resource's contact lists and/or interaction with contacts. Moreover, the ERT component 102 can be implemented in multiple email servers in order to ascertain an idea of what information that is being relayed to each other. Traditional systems are unaware of the context associated with data employed. In a particular instance, an email server application may have no clue of what type of information it is mailing. In other words, traditional systems basically have pure transaction based ontology. Thus, traditional systems can be aware of it's current state in the form of numeric data such as mail processed and maybe mails in the queue but it is blissfully unaware of the context of the mail that is sent (e.g., stemming from the fact that conventional systems only work around names, location, division, "anonymous" information, and the like without a conception of data context).

Furthermore, in corporations when people start writing a mail on some new area they are looking for information about they will not know the actual person, but rather have fuzzy understanding of what they are looking. For instance, a typical question can be "I need someone who knows about how to do cheap effective marketing and advertising in news papers" which can be made via any suitable data communication within the corporation's network. This is very far from actually communicating to the right person (e.g., John Johnson Marketing Lead) that would actually know how to proceed and/or be helpful in the area. Typically, the inquiring user will communicate to marketing and hope for a reaction in regards to the request. Users are forced into a tedious and very time consuming trial-and-error mission; when simply trying to find the right resource with the right knowledge. To make things even worse, most of the real communication in corporations is invisible and takes place via informal channels. In summary, the system 100 alleviates this situation and problem in the fact that data communications within the network 104 are gathered and evaluated in order to direct data communications to the appropriate resources.

In addition, the system 100 can include any suitable and/or necessary interface component 106 (herein referred to as "interface 106"), which provides various adapters, connectors, channels, communication paths, etc. to integrate the ERT component 102 into virtually any operating and/or database system(s) and/or with one another. In addition, the interface component 106 can provide various adapters, connectors, channels, communication paths, etc., that provide for interaction with the network 104 and any other device, resource, and/or component associated with the system 100.

Figure 2:
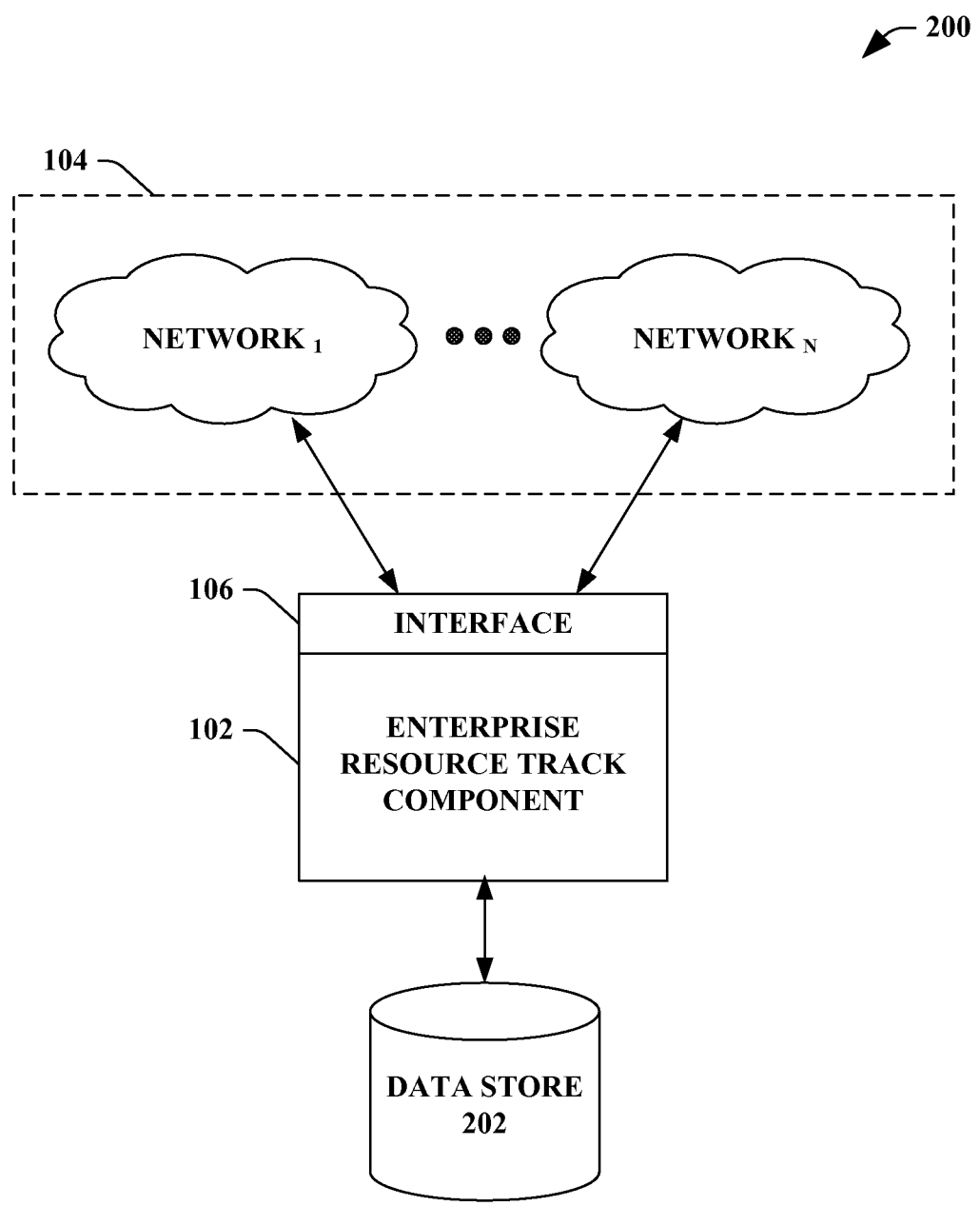
FIG. 2 illustrates a block diagram of an exemplary system that facilitates gleaning data from a plurality of networks for efficient utilizing of data communications and respective content.

FIG. 2 illustrates a system 200 that facilitates gleaning data from a plurality of networks for efficient utilizing of data communications and respective content. The system 200 includes the enterprise resource track (ERT) component 102 that can continuously glean and extrapolate context related to data communications within the network 104, wherein the data communications are between at least two or more resources. By collecting context and/or relevancy in connection with the data communications and respective resources, inquiries via data communications can be accurately directed to resources having knowledge and/or know-how associated with such context and/or topics. It is to be appreciated that the ERT component 102 can glean information related to any suitable network 104, wherein there can be any suitable number of networks such as network$_1$ to network$_N$, where N is a positive integer.

For instance, operating across networks with various resources (e.g., divisions, domains and product areas, etc.) in everyday business life can be increasingly important for people to operate within corporate communication. Traditional systems and techniques do not address this problem and essentially poses a severe threat to companies by resulting in many misplaced mails, phone calls, web site hits, etc. In general, there is an enormous amount of communication required in order to locate the right resource. The system 200 provides for the evaluation and monitoring of data within networks 104 in order to extrapolate context surrounding gathered data and to enable an understanding of each resource and respective capabilities and/or knowledge.

For instance, networks 104 (e.g. email servers, business portals, web servers, databases, any suitable entity associated with a data communication, etc.) can have a common ontology by utilizing the ERT component 102. In other words, the ERT component 102 allows a common understanding of the data such as what it is, what data is sent, and to whom the data is sent. Below are different sentences using the word "scaled"—but these sentences are very different:

1. "The lizard was ugly and scaled."
2. "The solution scaled well—so we could just add another server to the cluster to gain performance."
3. "Once scaled my fish turned out to be a whole pound heavier that the rest."
4. "I work for the company scaled and would like to enquire about cheap space travel."

The above can be associated with any suitable data communication such as short email messages. Following classical structuralism and the linguistic tradition introduced post mortem, it follows that meaning would derive from context, and that is the core. Networks typically just pass these along as packages without ever looking into them thus the typical networks/servers are unaware of the context. Basically, a traditional system may not be able to know that sentences 1, 2, 3 and 4 are different.

Another way of putting it would be to compare it to a computer controlling pumps but not having the computers actually knowing is being pumped though the pipes—thus not knowing characteristics of what is inside the pipes (e.g., density, temperature, fluid type, oil, water, orange juice, milk, quicksilver, etc.). Another example of problems due to missing ontology's is that the system is unaware who the people communicating really are. If *mister nobody* sends a mail to a colleague about the "direction Company A is taking" that mail probably has less value, than a mail sent by Chairman to CEO regarding the same subject. The ERT component 102 can analyze data within the network to see the difference in the two scenarios.

The ERT component 102 can evaluate the network 104 (e.g., email server, etc.) to not only evaluate into the packages of data but also establishes a memory of what it is seeing as well as a way of conveying to other systems what is being communicated. Thus, the system 200 can act intelligently based on its experience gathered from data communication and resource evaluation. Moreover, the system 200 can provide the storage of data and the understanding of multiple types of data resources.

The system 200 can further include a data store 202 that can include any suitable data related to the networks 104, enterprise resource track component 102, etc. For example, the data store 202 can store any suitable data associated with the system 200 such as, but not limited to, data related to a data communication, metadata associated with a data communication (e.g., email, instant messaging, web-browsing, web-mail, Internet protocol (IP) telephony, audio communications, video communications, voice mail, video mail, facsimile, metadata associated with a data communication, and/or any other suitable data that can be evaluated to provide a context thereof), data communication techniques, data formats within the network 104, network data, data related to a resource (e.g. a user, a person, an employee, a machine, a computer, a laptop, a server, a network, a department, a handheld, an email address, an email alias, an Internet protocol (IP) address, a website, a database, a contractor, a company, and/or any other suitable entity that can data can be directed and/or communicated to for response), contextual information associated with data communications, relevancy data extrapolated from the network 104, data related to a productivity tool (word processing, spread sheets, presentation software, mail applications, contact applications, etc.), any suitable data collected from the network 104, any suitable information gleaned and/or extrapolated from the monitored data communications within the network 104, etc.

It is to be appreciated that the data store 202 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 202 of the subject systems and methods is intended to comprise, without being limited to, these and any other suitable types of memory. In addition, it is to be appreciated that the data store 202 can be a server, a database, a hard drive, and the like.

Figure 3:
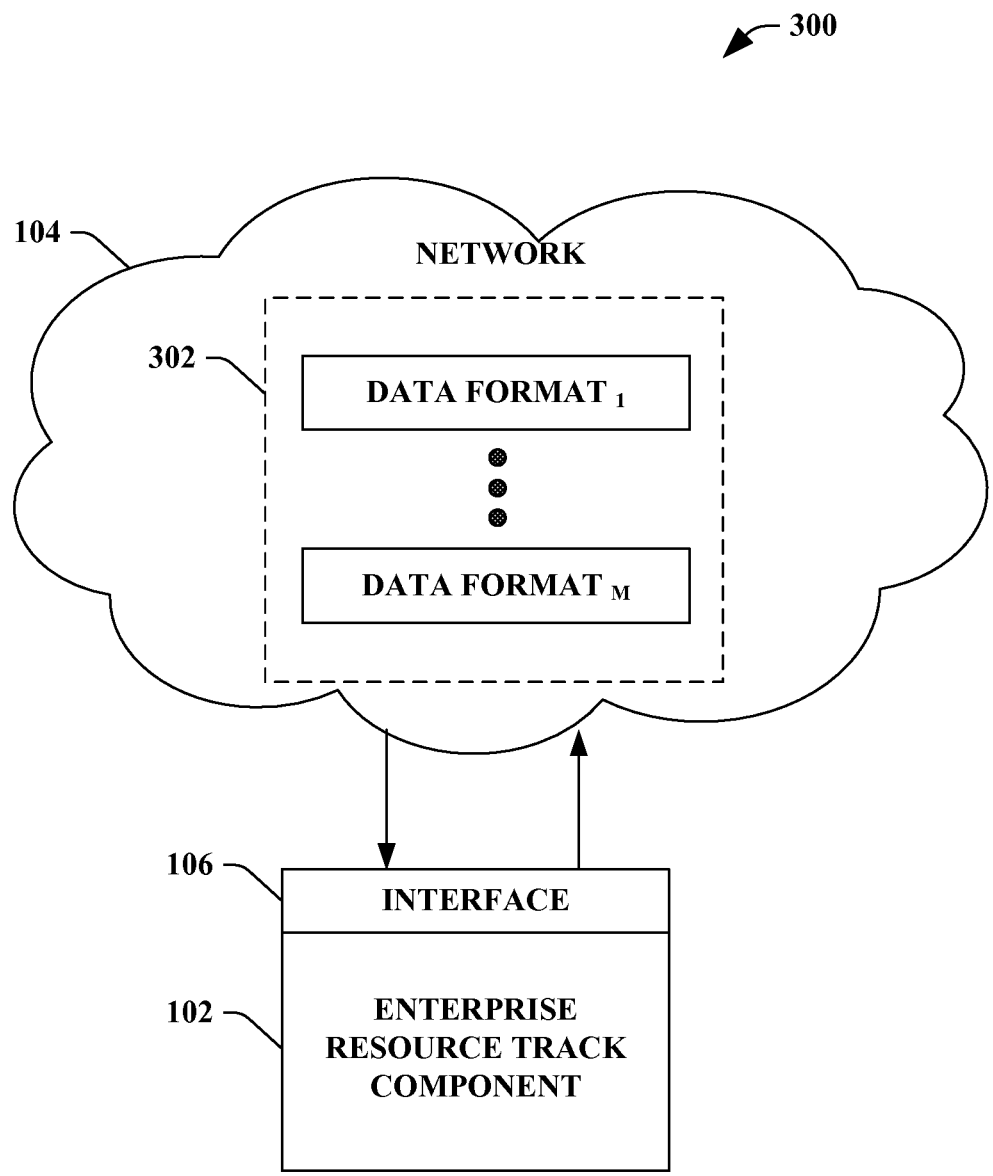
FIG. 3 illustrates a block diagram of an exemplary system that facilitates evaluating data communications with various formats within a network in order to formulate context associated with entities associated therewith.

FIG. 3 illustrates a system 300 that facilitates evaluating data communications with various formats within a network in order to formulate context associated with entities associated therewith. The enterprise resource track (ERT) component 102 can glean information related to at least one data communication associated with a resource within the network 104 in order to establish data context and/or relevance to facilitate directing communications within the network 104. In other words, the ERT component 102 can evaluate data within the network 104, wherein data communications can be directed to particular resources within the network 104 based at least in part upon the evaluation of data so as to be accurately handled. It is to be appreciated that the ERT component 102 can monitor and extrapolate information from any suitable data format 302 associated with the network 104. Moreover, there can be any suitable number of data formats 302 within the network 104 such as data format$_1$ to data format$_M$, where M is a positive integer.

For example, the ERT component 102 can deploy intelligent interconnected semantic networks that have respective own ontology's. Furthermore, the ERT component 102 can implement enterprise resource tracking of knowledge, wherein such enterprise resource tracking of knowledge can enable software systems to create new connections from data from multiple systems. The system 300 can connect to content of the data to help transport and convey information. The system 300 utilizes data that is already within the network 104 to help computers, machines, systems, etc. understand what data they are dealing with—in some sense the ERT component 102 can give a general idea of relevance.

In one example, such semantics can be derived from automated parsing of e-mail interactions (and content) and areas of interest as well as organizational structure. In other example, Internet interaction (e.g., web site, data uploaded, data downloaded, etc.), instant messaging (IM) traffic, and/ or any other suitable data communication within the network 104 can be analyzed to enable such data relevance and/or context. The ERT component 102 harnesses a wealth of information on how resources (e.g., employees, workers, departments, areas, people, etc.) communicate in businesses (e.g., corporations, any other suitable establishment that employs a network) and what their interests are and how they interact in general and with whom.

In other words, the ERT component 102 provides a context based ontology to act from. In theory, the system 300 can understand classical philosophical questions such as: "What exists," "What is this," "What am I," "What is my role? (am I important here?)," "Whom am I describing what to?," "Who is communicating and are they what to me?," etc. Furthermore, this common low level philosophy regarding universal interactions between a subject, a relationship, and an object can be provided by the system 300.

Figure 4:
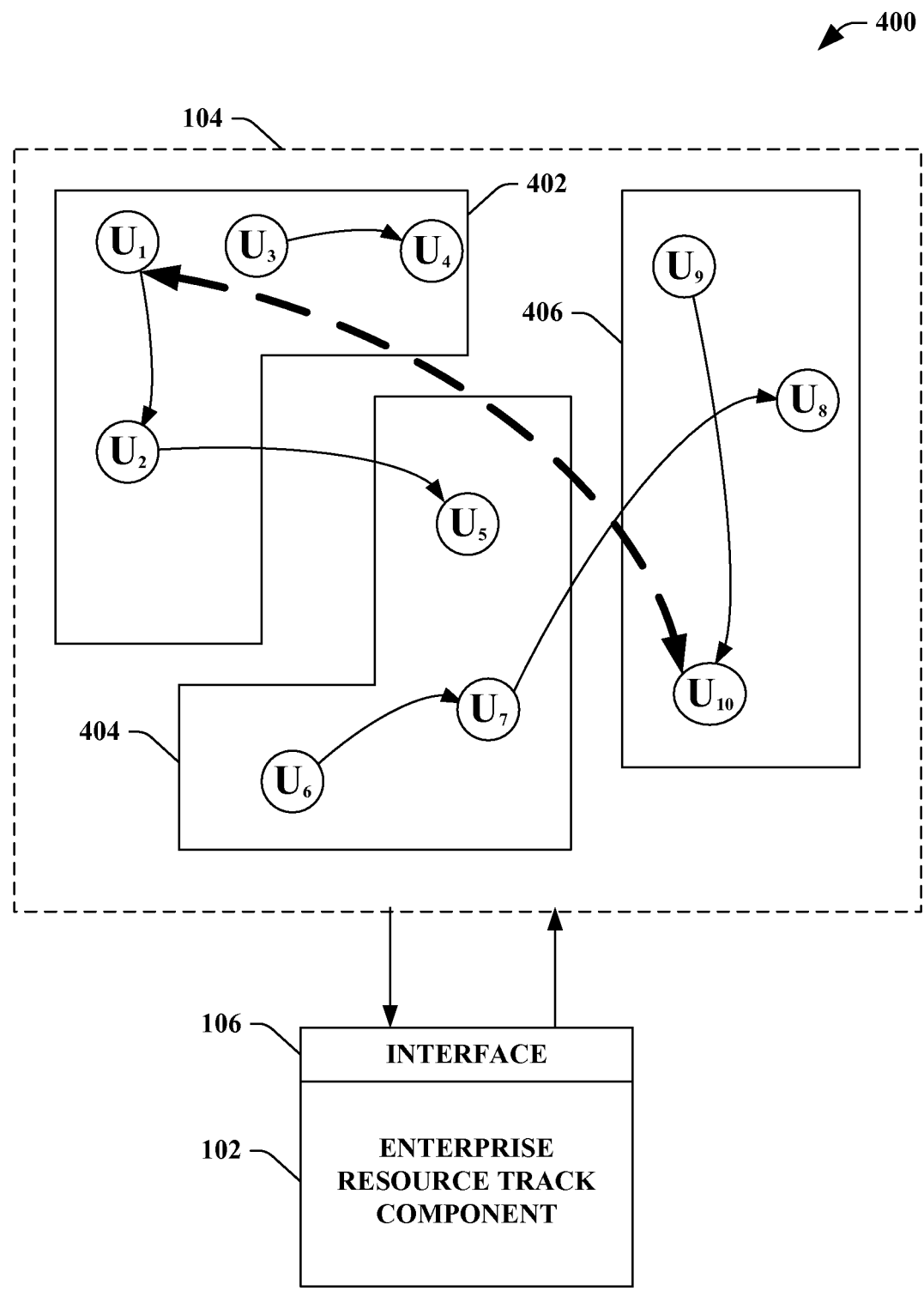
FIG. 4 illustrates a block diagram of an exemplary system that facilitates collecting data associated with communications within a network to enable efficient resource tracking and/or availability.

FIG. 4 illustrates a system 400 that facilitates collecting data associated with communications within a network to enable efficient resource tracking and/or availability. The enterprise resource track (ERT) component 102 can receive data via the interface 106, wherein such data can be collected from the network 104 in order to allow a context and/or relevancy to be established amongst such data. The ERT component 102 can establish relationships for resources based at least in part upon the context of data communicated between such resources. For instance, a person (e.g., a resource) in a first network may have a wealth of knowledge associated with payroll. Based on evaluating data communications corresponding to/from such person, the ERT component 102 can extrapolate that future inquiries (e.g., from a plurality of networks) associated with payroll can be handled by such person.

For instance, the network 104 can relate to, but is not limited to related to, email servers, business portals, web servers, databases, any suitable entity associated with a data communication, etc. The network 104 can further include any suitable number of sub-networks (e.g., such as a first sub-network 402, a second sub-network 404, and a third network 406), wherein the sub-networks can be organized in accordance to departments, size, pay structure, location, security levels, equipment, data communications, and/or any other suitable organizational manner employed by the network 104. It is to be appreciated that there can be any suitable number of sub-networks, and sub-networks of sub-networks, and so on and so forth. For the sake of brevity, the claimed subject matter will utilize the system 400 for illustration with the network 104 and sub-networks 402, 404, and 406. Moreover, there can be users (e.g., resources, machines, etc.) within the network 104 and within the sub-networks 402, 404, and/or 406. It is to be appreciated that there can be any suitable number of users and/or resources within the system 400 such as $U_1$, $U_2$, . . . , $U_{10}$, to $U_T$, where T is a positive integer.

The following are examples of some situations where the ERT component 102 can make a difference. It is to be appreciated that the following situations are examples and are not to be limiting on the subject innovation since it would be impractical to stipulate the entire width of the concept. In particular, the system 400 can assist to ensure the right people and/or resources are communicating and/or connecting.

The ERT component 102 allows the information within the network 104 to be utilized to evaluate if someone who should have a lot of ongoing dialogue and communication in regards to a data communication and/or resource is in fact not communicating. For instance, if a company has a strategy to get a lot of patents, the ERT component 102 can enable different innovation departments (or just people) to have correspondence (via email, video, web, and/or other data communications) with the patent legal department which would seem fit if the company were expecting to get patents.

Traditional networks are merely routing messages similar to a real life postman delivering mail. Even if the postman is delivering 20 hunting magazines to different neighbors in the same area, he does not tell those same people that there are people near by with similar interests. Within the network 104, a user ($U_1$) in the first sub-network 402 can send an email to another user in the first sub-network 402 inquiring on topic "X"—that information is never used constructively, in the sense that a user in sub-network 406 might be the foremost specialist in topic "X" and have written numerous (e.g., 10000) emails on topic "X"—it seems odd that the system is not able to hint that there is a person whom is an expert in topic "X"—that information is already in the system. In other words, traditional systems and/or techniques rely on the "luck of the draw" that a particular resource would relay the email to the expert and/or the email would happen to be transmitted to the expert.

Utilizing the ERT component 102 and the enterprise resource tracking of knowledge concept the networks 104 can notify each other that a resource (e.g., a user) is interested in topic "X." The practical implementations might be done in several different ways. But the key concept is simple: the networks 104 can share an understanding (e.g. ontology) of the communication(s) in the networks 104 and that they are able to communicate (with semantics) to each. The ERT component 102 can evaluate the communications between resources and/or users and direct the request from $U_1$ to the expert on topic "X" which is $U_{10}$ (e.g. where such direct linkage is illustrated by a dotted, bold double arrow), rather than convention manner of hoping the request luckily falls into the right hands and/or the person that has efficient knowledge to direct the request.

Figure 5:
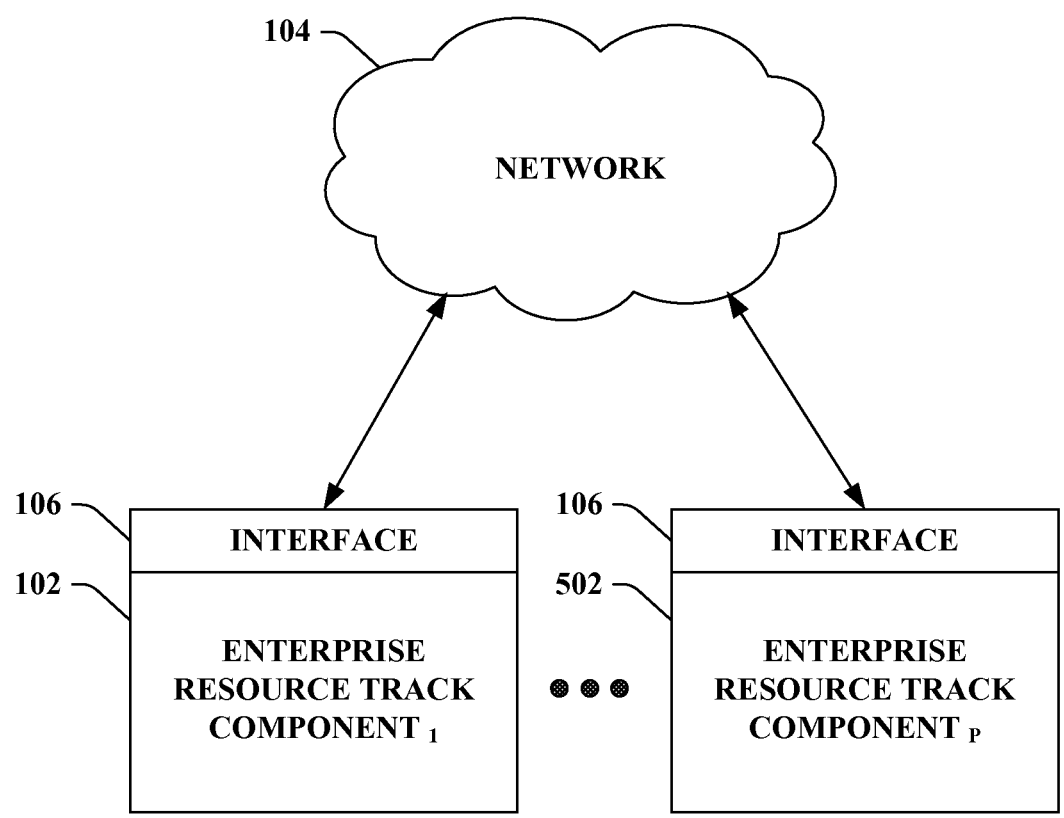
FIG. 5 illustrates a block diagram of an exemplary system that facilitates providing context and resource evaluation based upon data communications within a network.

FIG. 5 illustrates a system 500 that facilities providing context and resource evaluation based upon data communications within a network. The system 500 can include the enterprise resource track (ERT) component 102 that can continuously monitor and glean information/context/relevancy associated with data communications related to at least one resource within the network 104 in order to enable efficient directing and/or pipelining of information to appropriate resources. For example, the ERT component 102 can catalog the various resources included within the network 104 and also catalog topics filtered from various data communications respective to each resource. Thus, each resource can be effectively connected to various topics, wherein the ERT component 102 can direct and/or pipeline requests/data/communications to particular resources based on the topics connected therewith. Furthermore, it is to be appreciated that there can be any suitable number of enterprise resource track (ERT) components 102 that can glean information from the network 104, such as enterprise resource track component$_1$ to enterprise resource track component$_P$, where P is a positive integer.

Figure 6:
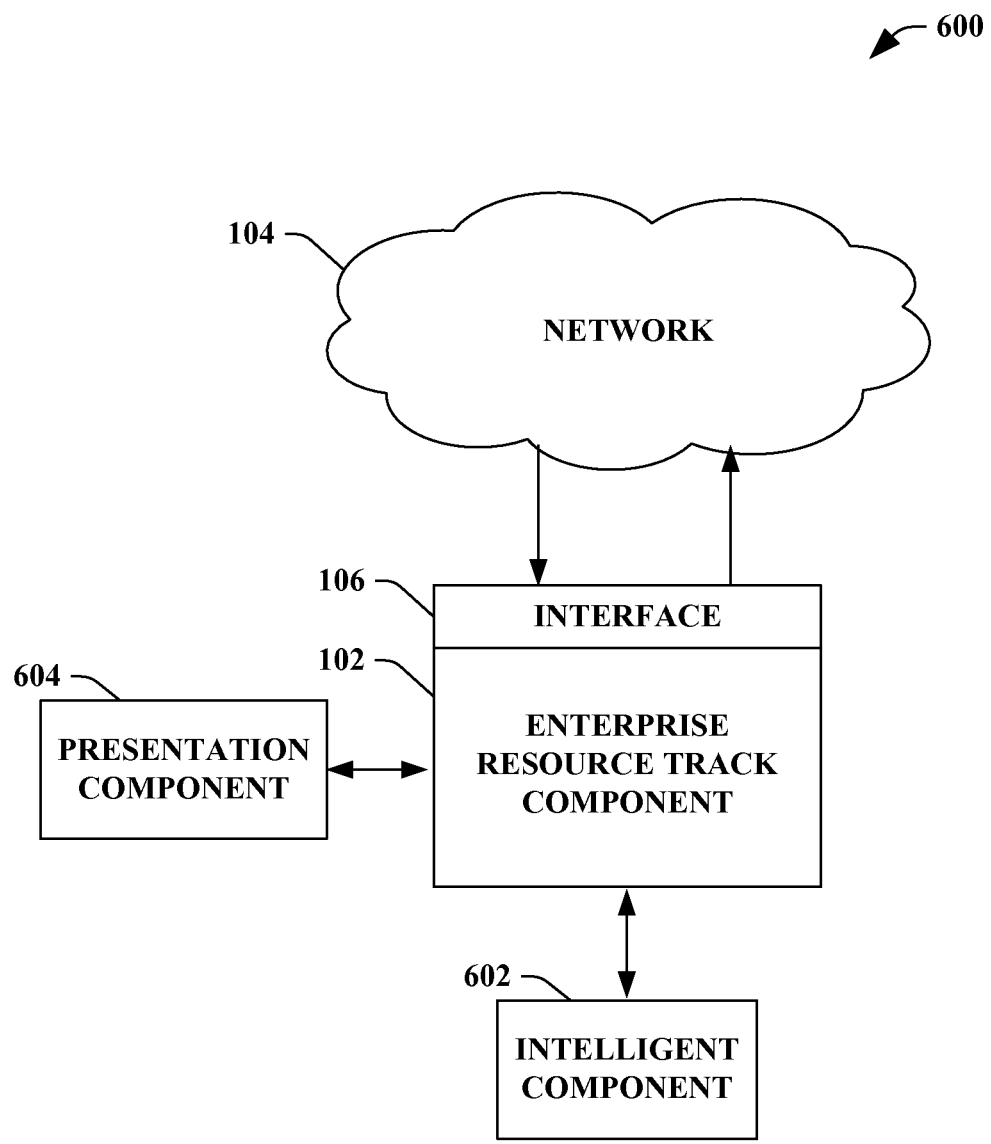
FIG. 6 illustrates a block diagram of an exemplary system that facilitates gathering data related to a network communication to generate context.

FIG. 6 illustrates a system 600 that employs intelligence to facilitate gathering data related to a network communication to generate context. The system 600 can include the enterprise resource track (ERT) component 102, the network 104, and the interface 106. It is to be appreciated that the ERT component 102, the network 104, and the interface 106 can be substantially similar to respective components, and networks described in previous figures. The system 600 further includes an intelligent component 602. The intelligent component 602 can be utilized by the ERT component 102 to facilitate extrapolating context and/or data relevance in relation to a resource within the network 104, wherein such extrapolation can be associated with at least one data communication. For example, the intelligent component 602 can infer resource evaluation, data communication context, data relevancy, relationship between data within the network 104 and resources, communication routing between resources, directing of queries within the network 104, gleaning data, evaluating data, data communication settings/configurations, data communication selection, topics associated with resources, hierarchy of relevancy connected to data communication topics and resources, relationship between data within a data communication and a topic and a resource, etc.

It is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g. support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

The ERT component 102 can further utilize a presentation component 604 that provides various types of user interfaces to facilitate interaction between a user and any component coupled to the ERT component 102. As depicted, the presentation component 604 is a separate entity that can be utilized with the ERT component 102. However, it is to be appreciated that the presentation component 604 and/or similar view components can be incorporated into the ERT component 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the ERT component 102.

The user can also interact with the regions to select and provide information via various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can than provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 7:
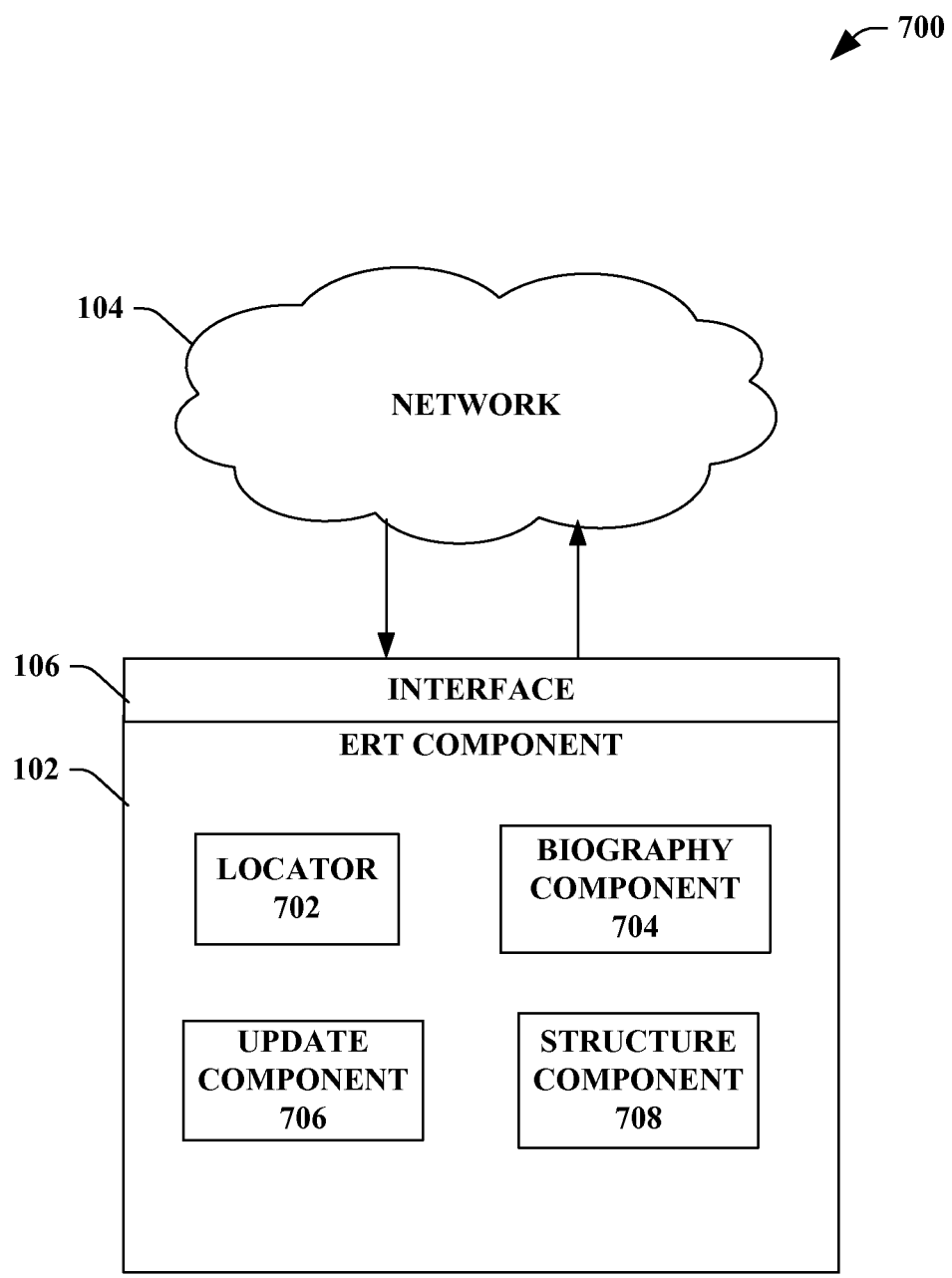
FIG. 7 illustrates a block diagram of an exemplary system that facilitates creating resource identification and/or accountability based upon data communications within a network.

FIG. 7 illustrates a system 700 that facilitates creating resource identification and/or accountability based upon data communications within a network. The system 700 can include the enterprise resource track (ERT) component 102 that evaluates data communications within the network 104 in order to ascertain relationships between context/content of such data communications and resources (e.g., recipients/senders of such data communications). Moreover, the ERT component 102 can glean information associated with various data communications within the network 104 in order to allow the system 700 to be aware of data content and/or provide data relevance. With such data relevance and/or awareness based on the collection and/or analysis of gleaned data, the ERT component 102 can efficiently direct data communications to particular resources such that the resources have knowledge of topics within the directed data communications.

The ERT component 102 can include a locator 702 that utilizes data context and/or relevancy to direct communications and/or requests to an appropriate resource. The locator 702 can facilitate finding a person in an organization that could serve as a contact for a specific topic within a division and/or across divisions. The locator 702 can eliminate wasted time and the synergies loss. Moreover, the locator 702 allows the initiative to be taken since finding the right contact person is simpler, less troublesome, and less time consuming. The locator 702 can provide a search for key words describing areas of expertise, areas of interest or specific job responsibilities as well as the relationship and ongoing communication between various stakeholders, users, and/or resources within the network 104.

Moreover, the locator 702 can assist in asking and/or requesting the appropriate information. In a world of three letter acronyms and industry speak, it is often difficult to know exactly which search terms to use, especially if one gets out of an area of expertise. The locator 702 can utilize a common dictionary and ontology to tolerate inexact searches by having the ability to search for the intended meaning, rather than an exact word match, leading to a web of results. For instance, the search for "Peer to Peer Computing" would return information on the "Dynamic Systems Initiative" as well as related technologies such as virtualization, blade computing, standards such as "Open Grid Services Architecture" and applications such as "application hosting," "software as a service," "car crash simulation," "data mining," etc.

The locator 702 can employ effective communication across an organization. For instance, the locator 702 can generate a distribution list (e.g., a tedious task) that will ensure nobody that has a keen interest in the information exchange is missed and/or left off. The locator 702 assists in understanding whom the various stakeholders in a subject are. The locator 702 can further leverage the network 104 of users associated with a specific topic or area of interest to auto-generate a distribution list in order to save time and money whilst streamlining communications. In a substantially similar way, the locator 702 can automatically generate a list of suggested recipients of an e-mail based on the context of the e-mail that is matched to user profiles. Likewise, the locator 702 can leverage existing recipients to suggest additional recipients based on pattern matching The ERT component 102 can include a biography component 704 that can utilize data context extrapolated from data communications in order to generate biographical information associated with particular resources within the network 104. The biography component 704 assist when there are days with back to back meetings that produce little if any results because people walk in largely unprepared. The biography component 704 can produce a briefing document on a person's background, interests, specialties, etc. In another example, the biography component 704 can aggregate a range of hyperlinks that lead you to the latest information/documents of the subject posted across various share point portal sites as well as the related e-mail traffic.

The system 700 can further include an update component 706 that can continuously ensure updated information to be utilized and/or distributed within the network 104 based on the evaluated data communications. The update component 706 can obtain a deeper and deeper understanding of a user's interests and areas of expertise/responsibilities. Whilst such a "learning profile" can help continuously improve the relevance and performance of the overall system 700, it can be applied in a variety of interesting ways. The update component 706 can utilize an informational profile to automatically generate news alerts based on external (e.g. news up-dates on the web, new web sites, blogs, etc.) and internal (e.g., e-mail exchange, up-dates to sharepoint portals, etc.) that are delivered to user(s) in period intervals or as they occur (e.g., dynamically).

Furthermore, the update component 706 can utilize a user's personalized portal to automatically populate with relevant information using RSS (e.g., Really Simple Syndication, RDF Site Summary, Rich Site Summary, and/or any suitable form of web syndication utilized by news websites and/or weblogs) and other technologies in order to continuously increase the relevance of a users portal over time. Besides the obvious user benefits, this opens up interesting opportunities for monetization via personalized advertising, especially in view of the fact that users will likely spend significantly more time on their personalized home page in view of content relevance.

The ERT component can further utilize a structure component 708 that can generate organizational data based on the gleaned information from the network 104. As one is looking for specific information or contact people within the organization, it is often useful to know the organizational context. For instance, mail programs and/or software can contain relevant information including reporting structures that can be leveraged by the structure component 708 to generate an organizational chart (org chart).

Moreover, the structure component 708 can allow the generation of a virtual org chart that allows insight into the various players (e.g., individuals, users, resources, and the like) that share an interest for a specific topic, such as "Mobility" including related technology topics such as Mobile Application Framework, radio frequency identification (RFID), structured query language (SQL) as well as related applications such as Mobile Asset Management as well as partner related information on Independent Hardware Vendors—and so on and so forth.

With the structure component 708 the ability to graphically display and analyze the underlying communications structure of an organization can create compelling insights into ongoing information exchange and internal collaboration. The more data sources one would tap into (e.g., e-mail traffic, outlook profiles, sharepoint services, knowledge management systems, etc.), the richer the experience and the insight that could be derived. Such insight utilizing the structure component 708 can prove useful in various ways, including realigning reporting structures to reflect the realities of the business and to unleash synergies, the alignment of objectives/commitments across teams or address mundane issues such as the office layout to support and foster communication. Similarly, the structure component 708 can avoid duplication of efforts and/or can allow such collaboration to be proactively motivated or enforced.

Furthermore the structure component 708 can provide top down information dissemination and bottom up control. Related to collaboration and data dissemination, the structure component 708 can provide management to monitor and improve the information flow across the organization and/or network 104. Often times, management relies on multiple layers of management to institutionalize a new strategic direction or other programs. The structure component 708 can foster an understanding if and how such information is being disseminated across the organization. It could provide useful insights into the effectiveness of individual managers and would even allow to back-trace the root cause for ineffective communication or internalization of a new program within the chain of command.

Likewise, an adaptive organization relies on the initiative of individual contributors to research new technologies or applications and to generate ideas aimed at monetizing them. Often times these initiatives triggered by small groups of individuals suffer from a lack of management support and resulting lack of funding. The structure component 708 can allow for the "vibe" in the organization to be monitored. For instance, one could be alerted that recently there has been a significant increase around the "Semantic Web." At the same time, the structure component 708 can inform you that the activity has emerged in the Business Division, and there seems to be little if any communication on this subject within the group dealing with applications. The structure component 708 can also compare the level of internal interest measured through internal communication with the level of coverage a specific subject garners in the World Wide Web to understand if one is missing yet another boat/under-investing in specific area.

Figure 8:
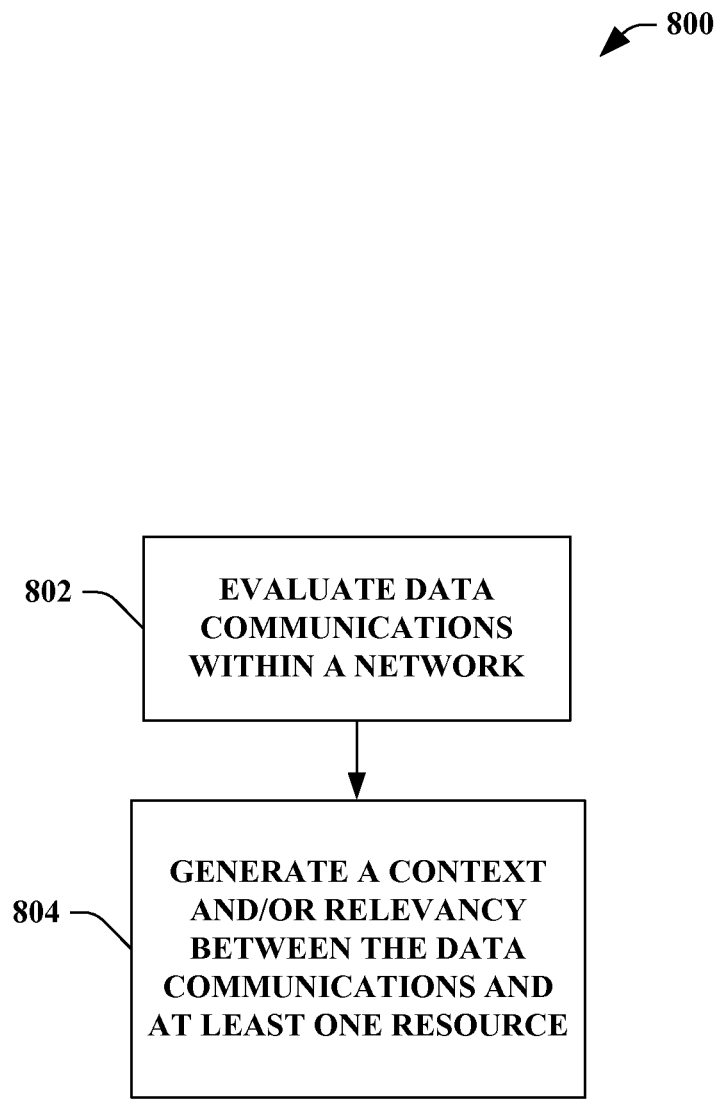
FIG. 8 illustrates an exemplary methodology that facilitates gleaning data from a plurality of networks for efficient utilizing of data communications and respective content.
Figure 9:
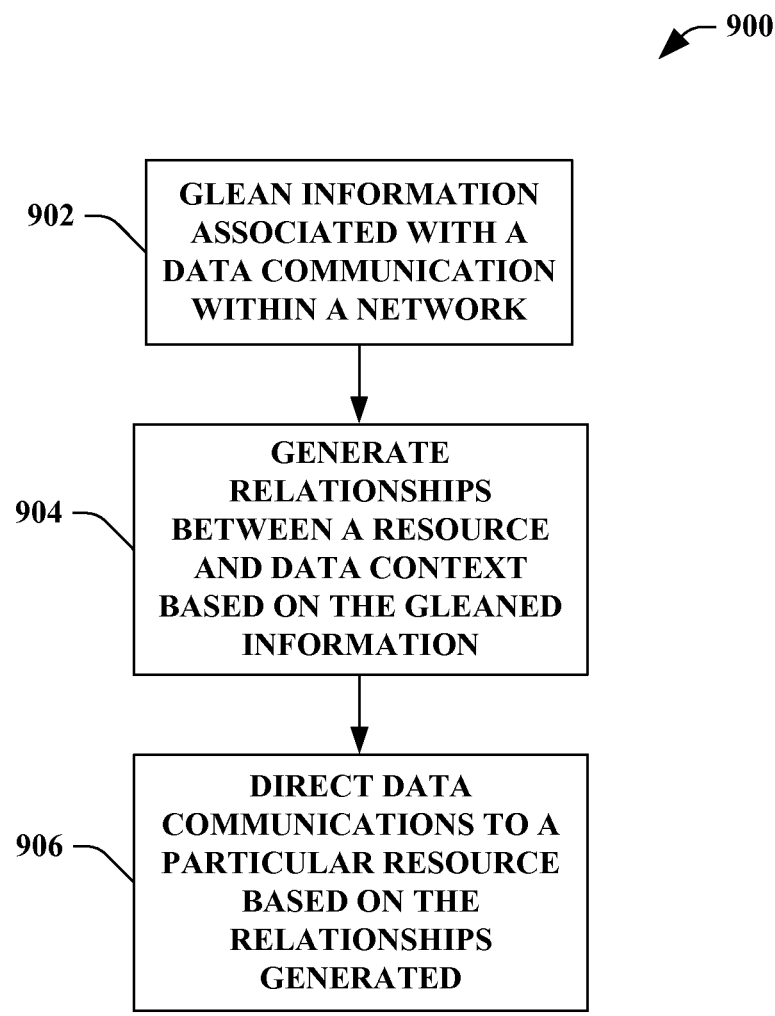
FIG. 9 illustrates an exemplary methodology for evaluating data communications with various formats within a network in order to formulate context associated with entities associated therewith.
Figure 10:
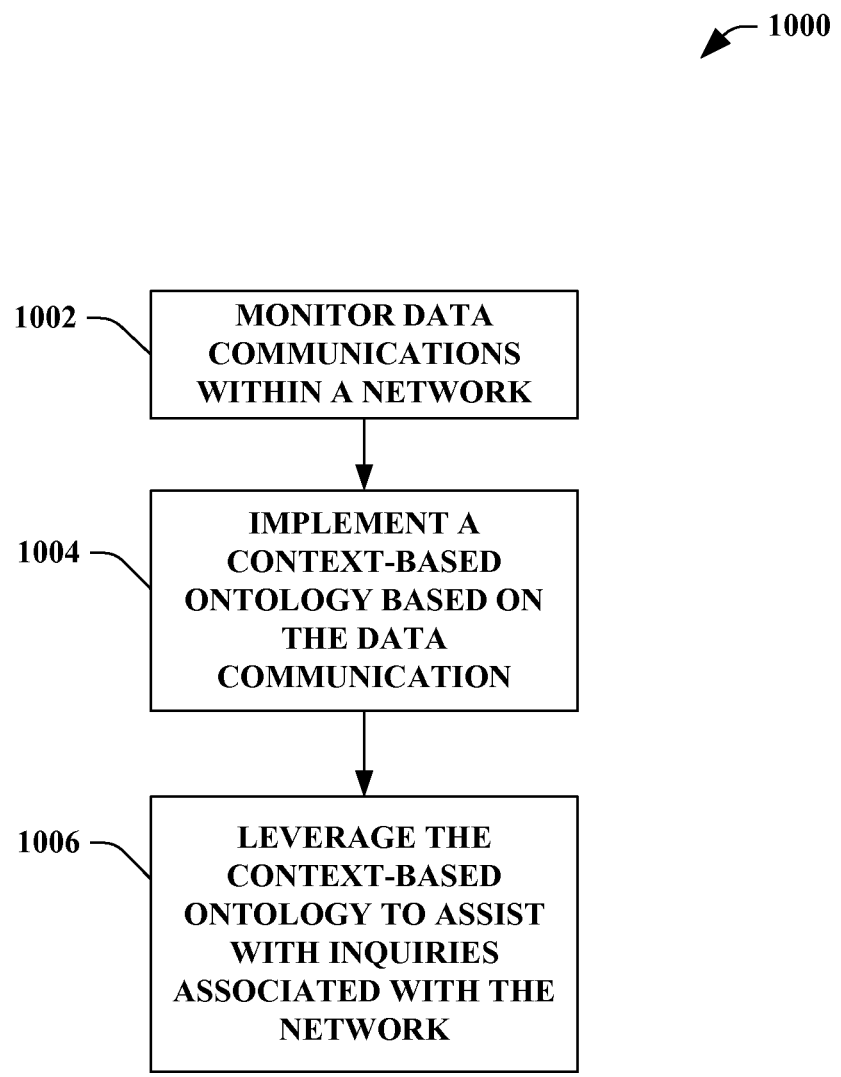
FIG. 10 illustrates an exemplary methodology that facilitates creating resource identification and/or accountability based upon data communications within a network.

FIGS. 8-10 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 8 illustrates a methodology 800 that facilitates gleaning data from a plurality of networks for efficient utilizing of data communications and respective content. At reference numeral 802, data communications within a network can be evaluated. The data communications can be, but are not limited to, email, instant messaging, web-browsing, web-mail, Internet protocol (IP) telephony, audio communications, video communications, voice mail, video mail, facsimile, metadata associated with a data communication, and/or any other suitable data that can be evaluated to provide a context thereof. Moreover, the data communication can be any electronic communication from and/or to at least one resource associated with the network, wherein the network can be, for instance, email servers, business portals, web servers, databases, any suitable entity associated with a data communication, etc.

At reference numeral 804, a context and/or relevancy can be generated between the data communications and at least one resource. The context and/or relevancy can allow the accurate dissemination of information to be employed within the network. Moreover, the resource can be, but is not limited to being, a user, a person, an employee, a machine, a computer, a laptop, a server, a network, a department, a handheld, an email address, an email alias, an Internet protocol (IP) address, a website, a database, a contractor, a company, and/or any other suitable entity that can data can be directed and/or communicated to for response.

For example, email communications associated with the network can be evaluated in order to provide data context and/or relevancy. Thus, email communication between various users and/or machines can be analyzed in order to formulate an understanding on which particular resources correspond to specific topics and/or contexts ascertained. In other words, if a first user continuously answers marketing questions received by various entities within a company, such data communications can be evaluated and data inquiries associated with marketing can be directed to such user through any suitable data communication.

FIG. 9 illustrates a methodology 900 for evaluating data communications with various formats within a network in order to formulate context associated with entities associated therewith. At reference numeral 902, information associated with a data communication within a network can be gleaned.

For example, the data communication within the network (e.g., email servers, business portals, web servers, databases, any suitable entity associated with a data communication, etc.) can be any electronic communication from and/or to at least one resource, wherein the resource can be a user, a person, an employee, a machine, a computer, a laptop, a server, a network, a department, a handheld, an email address, an email alias, an Internet protocol (IP) address, a website, a database, a contractor, a company, and/or any other suitable entity that can data can be directed and/or communicated to for response.

At reference numeral 904, relationships between a resource and data context can be generated based at least on the gleaned information. In other words, each resource can be associated with particular topics and/or relationships generated based on the evaluation of data communications to and/or from such resource. For instance, a resource can be associated with projected sales. By gleaning data communications associated with this resource, various correlated topics and/or relationships can be created and/or inferred such as, projecting sales within the manufacturing department, chart creation, presentation assistance, sales data, prices, etc. Thus, gleaning information from data communications related to the resource can produce relationships not directly obvious and/or noticeable.

At reference numeral 906, data communications can be directed to a particular resource based on the relationships generated. Such directing and/or pipelining information and/or data communications to specific resources can allow efficient communication within the network. The creation of relationships with data communications and resources enables context of such data communications to enhance the knowledge and/or awareness of the abilities of each resource. For instance, by examining data communications of a resource, requests and/or inquiries can be properly channeled based on previous experience with such requests and/or inquiries. In one example, if a new employee is concerned about purchasing a parking pass, typically the new employee is forced to use one of the following: word of mouth, blind emails to broad and sweeping aliases, numerous telephone calls, massive re-connections via telephone, the run-around from employee to employee, browsing various websites, etc. However, by gleaning information within the network and generating relationships, a parking issue can be learned and/or extrapolated to be handled by human resources and particularly Barbara Jones in the employment division. Such techniques greatly enhance any network and/or business and increase productivity and/or efficiency.

FIG. 10 illustrates a methodology 1000 that facilitates creating resource identification and/or accountability based upon data communications within a network. At reference numeral 1002, data communications (e.g., email, instant messaging, web-browsing, web-mail, Internet protocol (IP) telephony, audio communications, video communications, voice mail, video mail, facsimile, metadata associated with a data communication, and/or any other suitable data that can be evaluated to provide a context thereof) can be monitored within a network. At reference numeral 1004, a context-based ontology can be implemented based at least in part upon the data communication. For instance, networks (e.g., email servers, business portals, web servers, databases, any suitable entity associated with a data communication, etc.) can have a common ontology by utilizing the claimed subject matter. In other words, by monitoring data communications within the network, the subject innovation allows a common understanding of the data such as what it is, what data is sent, and to whom the data is sent.

At reference numeral 1006, the context-based ontology can be leveraged to assist with an inquiry associated with the network. For example, the context-based ontology can be utilized to assist with the following situations and/or examples within a network: finding the appropriate person, finding the appropriate question to ask, ensuring ongoing information is up-to-date, auto-generating distribution lists, auto-generating mail recipients, auto-generating pre-meeting content, auto-generating organizational chart reporting structure, auto-generating virtual organizational chart, providing top down information dissemination and bottom up control, etc.

Figure 11:
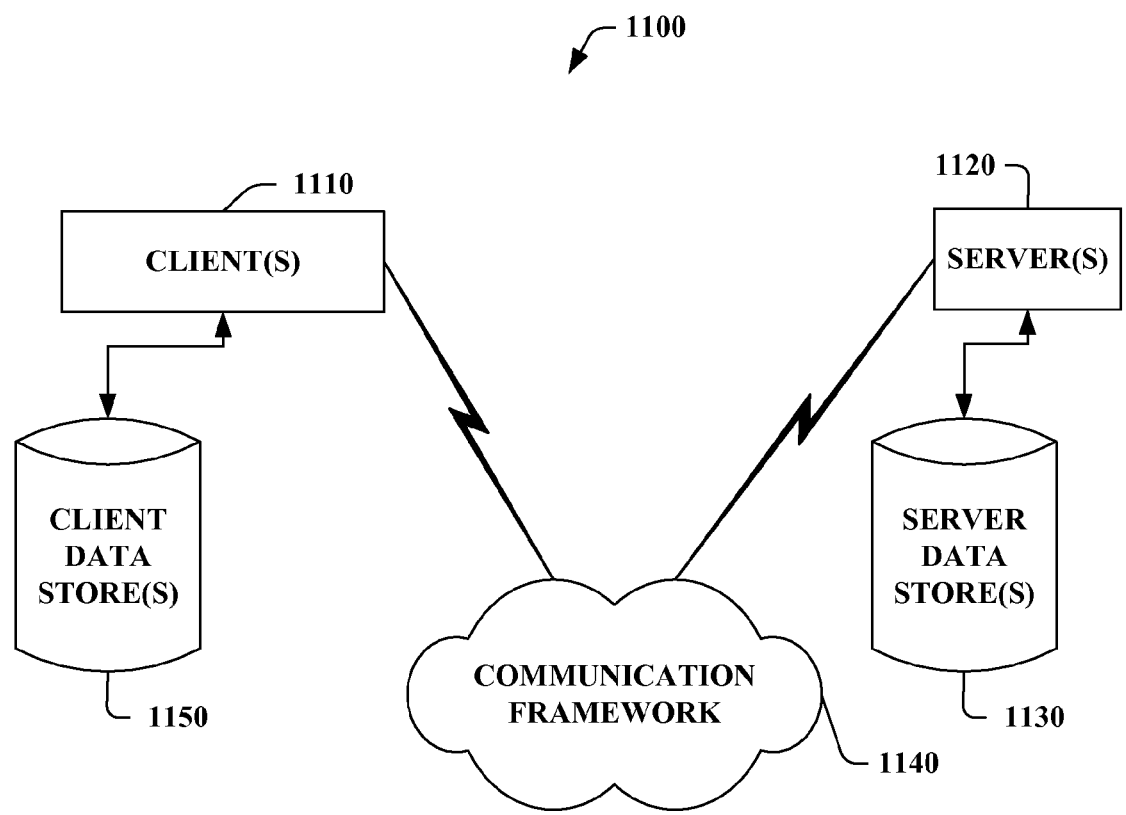
FIG. 11 illustrates an exemplary networking environment, wherein the novel aspects of the claimed subject matter can be employed.
Figure 12:
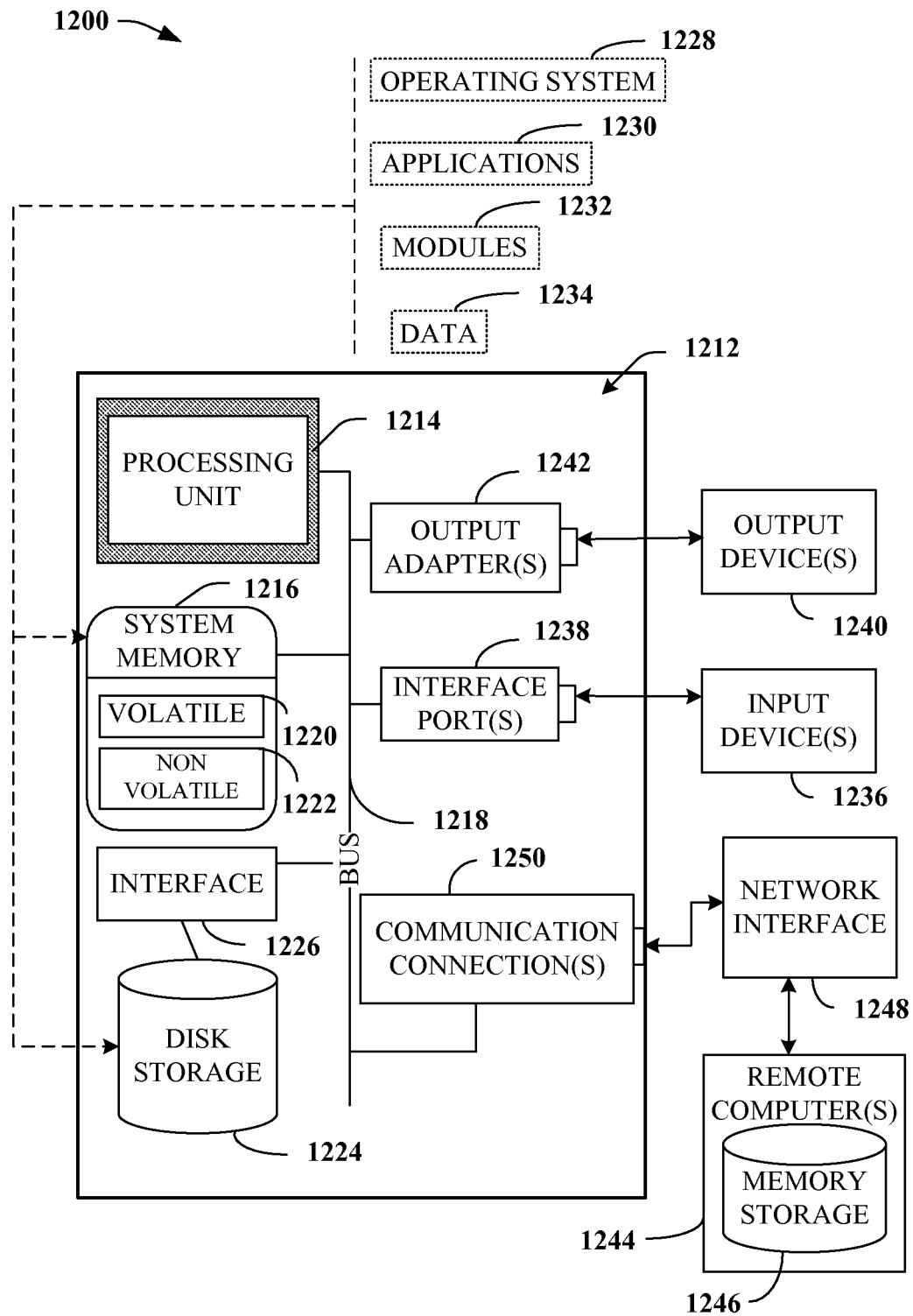
FIG. 12 illustrates an exemplary operating environment that can be employed in accordance with the claimed subject matter.

In order to provide additional context for implementing various aspects of the claimed subject matter, FIGS. 11-12 and the following discussion is intended to provide a brief, general description of a suitable computing environment in which the various aspects of the subject innovation may be implemented. For example, enterprise resource track (ERT) component that facilitates gleaning information associated with data communications within a network in order to provide context and/or evaluation of associated data, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 11 is a schematic block diagram of a sample-computing environment 1100 with which the claimed subject matter can interact. The system 1100 includes one or more client(s) 1110. The client(s) 1110 can be hardware and/or software (e.g., threads, processes, computing devices). The system 1100 also includes one or more server(s) 1120. The server(s) 1120 can be hardware and/or software (e.g., threads, processes, computing devices). The servers 1120 can house threads to perform transformations by employing the subject innovation, for example.

One possible communication between a client 1110 and a server 1120 can be in the form of a data packet adapted to be transmitted between two or more computer processes. The system 1100 includes a communication framework 1140 that can be employed to facilitate communications between the client(s) 1110 and the server(s) 1120. The client(s) 1110 are operably connected to one or more client data store(s) 1140 that can be employed to store information local to the client(s) 1110. Similarly, the server(s) 1120 are operably connected to one or more server data store(s) 1130 that can be employed to store information local to the servers 1120.

With reference to FIG. 12, an exemplary environment 1200 for implementing various aspects of the claimed subject matter includes a computer 1212. The computer 1212 includes a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214.

The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1216 includes volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), or flash memory. Volatile memory 1220 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example a disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to the system bus 1218, a removable or non-removable interface is typically used such as interface 1226.

It is to be appreciated that FIG. 12 describes software that acts as an intermediary between users and the basic computer resources described in the suitable operating environment 1200. Such software includes an operating system 1228. Operating system 1228, which can be stored on disk storage 1224, acts to control and allocate resources of the computer system 1212. System applications 1230 take advantage of the management of resources by operating system 1228 through program modules 1232 and program data 1234 stored either in system memory 1216 or on disk storage 1224. It is to be appreciated that the claimed subject matter can be implemented with various operating systems or combinations of operating systems.

A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port may be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a personal computer, a server, a router, a network PC, a workstation, a microprocessor based appliance, a peer device or other common network node and the like, and typically includes many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refers to the hardware/software employed to connect the network interface 1248 to the bus 1218. While communication connection 1250 is shown for illustrative clarity inside computer 1212, it can also be external to computer 1212. The hardware/software necessary for connection to the network interface 1248 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates utilizing data within a network, comprising:
   a memory storing computer-executable instructions of:
      an interface that receives data associated with a target data communication sent to a resource within a network; and
      an enterprise resource track (ERT) component that
         analyzes data communications accessible via the network to identify topics of the data communications, each data communication accessible via the network having been sent to the resource;
         associates with each of a plurality of resources topics of the data communications sent to that resource such that each resource has one or more associated topics; and
         upon receiving via the interface the data associated with the target data communication,
            analyzes the received data to identify a target topic of the data;
            identifies resources that are associated with the target topic;
            selects one of the identified resources as a target resource to send the target data communication to enable the target data communication to be efficiently directed to the target resource;
            sends the target data communication to the target resource for processing such that data communications are automatically directed to target resources based on previously received data communications with the same topic as the target topic having been sent to the target resource; and
   a processor for executing the computer-executable instructions stored in the memory.

2. A method performed by a computer for directing data communications to resources, the method comprising:
   analyzing by the computer previously received data communications to identify topics of the data communications, each data communication having been directed to a resource;
   for each of the plurality of resources, associating topics of the data communications directed to the resource; and
   upon receiving a target data communication,
      analyzing the received target data communication to identify a target topic of the target data communication; and
      selecting a target resource to direct the target data communication based on comparison of the target topic to the topics associated with the resources to enable the target data communication to be directed to the target resource.

3. A computer-readable storage device containing computer-executable instructions for controlling a computing device to direct data communications to recipients, by a method comprising:
   providing a classifier for classifying context with recipients by
      analyzing previously received data communications to identify context of the data communications, each data communication having been directed to a recipient; and
      generating a function to associate recipients with context of the data communications directed to the recipients; and
   upon receiving a target data communication,
      analyzing the received data target communication to identify a target context of the received target data communication;
      selecting a target recipient by applying the classifier to the target context to identify the target recipient; and
      directing the target data communication to the target recipient.

4. The computer-readable storage device of claim 3 wherein the data communications are electronic mail messages.

5. The computer-readable storage device of claim 3 wherein the classifier generates a confidence that the target recipient is a desired recipient.

6. The system of claim 1, the data communication is at least one of email, instant messaging, web-browsing, web-mail, Internet protocol (IP) telephony, audio communications, video communications, voice mail, video mail, facsimile, metadata associated with the data communication, software application associated with a resource, a productivity tool utilized by the resource, a word processing application, a spread sheet application, presentation software, a mail application, and a contact application.

7. The system of claim 1, the network is at least one of an email server, a business portal, a web server, a database, a business, an enterprise, a corporation, a network including at least one sub-network, a department, a portion of a business, and a collection of at least two machines enable communication for a resource.

8. The system of claim 1, the resource is at least one of a user, a person, an employee, a machine, a computer, a laptop, a server, a network, a department, a handheld, an email address, an email alias, an Internet protocol (IP) address, a website, a database, a contractor, a company, an entity that receives data, and an entity that communicates data.

9. The system of claim 1, the ERT component uses information from a plurality of networks in order to associate topics with resources.

10. The system of claim 1, the ERT component evaluates at least one data format respective to the data communication within the network.

11. The system of claim 1, further comprising a disparate ERT component to extrapolate topics associated with data communications within the network.

12. The system of claim 1, further comprising a locator that utilizes the identified target topic the target data communication and an inquiry.

13. The system of claim 12, the locator further enables identifying an appropriate resource based at least in part upon the identified topics from previous data communications.

14. The system of claim 12, the locator accurately configures an inquiry based on the identified target topic within the network, the configuration enhances accuracy of the inquiry in relation to a search.

15. The system of claim 12, the locator automatically generates at least one of a distribution list and a recipient list based at least in part upon the topics associated with the resources.

16. The system of claim 1, further comprising a biography component utilizes a topic extrapolated from data communications in order to generate biographical information associated with at least one resource within the network.

17. The system of claim 16, the biography component creates a document relating to the resource which includes at least one of a resource's background, interest, specialty, location, biographical information, age, employment information, and educational background.

18. The system of claim 16, the biography component produces at least one hyperlink that includes information related to a subject across at least one of a share point portal site and e-mail traffic.

19. The system of claim 1, further comprising an update component that continuously ensures updated information is utilized based on the identified topics of the data communications.

20. The system of claim 1, further comprising a structure component that produces an organizational chart including at least one resource within the network, the organizational chart includes a topic of interest respective to each resource.

* * * * *